United States Patent [19]
Mowill

[11] Patent Number: 5,924,276
[45] Date of Patent: Jul. 20, 1999

[54] PREMIXER WITH DILUTION AIR BYPASS VALVE ASSEMBLY

[76] Inventor: R. Jan Mowill, Opra B.V., P.O. Box 838, 7550 AV Hengelo, Netherlands

[21] Appl. No.: 08/892,397

[22] Filed: Jul. 15, 1997

Related U.S. Application Data

[60] Provisional application No. 60/021,920, Jul. 17, 1996, provisional application No. 60/022,241, Jul. 22, 1996, provisional application No. 60/032,922, Dec. 6, 1996, and provisional application No. 60/038,943, Mar. 7, 1997.

[51] Int. Cl.$^6$ .................................................. F23R 3/26
[52] U.S. Cl. ............................................ 60/39.23; 60/737
[58] Field of Search ................................ 60/39.23, 39.29, 60/737, 738, 752

[56] References Cited

U.S. PATENT DOCUMENTS

| | | |
|---|---|---|
| 1,705,383 | 3/1929 | Weiss . |
| 2,108,822 | 2/1938 | Lippincott . |
| 2,183,836 | 12/1939 | Gordon, Jr. . |

(List continued on next page.)

FOREIGN PATENT DOCUMENTS

| | | |
|---|---|---|
| 0 074 196 | 3/1983 | European Pat. Off. . |
| A1 0 100 135 | 2/1984 | European Pat. Off. . |
| A1 0 161 561 | 11/1985 | European Pat. Off. . |
| 0 247 984 | 12/1987 | European Pat. Off. . |
| 2 288 011 | 10/1995 | European Pat. Off. . |
| 0 681 099 | 11/1995 | European Pat. Off. . |
| 0 731 316 A1 | 9/1996 | European Pat. Off. . |
| 55-45739 | 11/1980 | Japan . |
| 57-41524 | 3/1982 | Japan . |
| 301137 | 11/1954 | Switzerland . |
| 610641 | 10/1948 | United Kingdom . |
| 668834 | 3/1952 | United Kingdom . |
| 695342 | 8/1953 | United Kingdom . |
| 720436 | 12/1954 | United Kingdom . |
| 816678 | 7/1959 | United Kingdom . |
| WO 94/00717 | 1/1994 | WIPO . |

OTHER PUBLICATIONS

Sheperd, D.G. "Principles of Turbomachinery", New York, The Macmillan Co., 1956, pp. 282–289.
Csanady, G.T. "Turbomachines", New York; McGraw–Hill Book Co., 1964, pp. 14–23.
Cox, H.R. "Gas Turbine Principles and Practice", D. Van Nostrand, pp. 2–26, 2–39.
Treager, E.E., "Aircraft Gas Turbine Technology", 2nd Ed. p. 10.
Leonard, G. and Stegmaier, J., "Development of an Aero-derivative Gas Turbine DLE Combustion System," Diesel & Gas Turbine Worldwide, May 1993.
Fuel Injector Cuts NOx; Professional Engineering, Sep. 1994.

*Primary Examiner*—Louis J. Casaregola
*Attorney, Agent, or Firm*—Finnegan, Henderson, Farabow, Garrett & Dunner

[57] ABSTRACT

A low emissions combustor system for a gas turbine includes a combustion chamber liner defining a combustion space for combusting a homogeneous fuel and compressed air mixture received through an inlet to produce combustion gases for delivery to the turbine through a liner exit. The liner has both principal dilution ports and secondary dilution ports adjacent and upstream of the liner exit, and a premixer assembly operatively connected to the liner for providing the fuel/air mixture. The premixer assembly includes an air valve for controlling the fuel/air ratio of the mixture. The combustor system also includes a compressed air supply plenum upstream of, and in flow communication with, the air valve. A shroud partly surrounds the liner and provides a cooling channel between the plenum and the principal dilution ports. The combustor system still further includes a bypass channel between the plenum and the secondary dilution ports, and a bypass valve operatively positioned to control flow from the plenum through the bypass channel. Alternatively, a single valve may be employed for regulating the flow of compressed air into the compressed air supply chamber and the bypass channel in lieu of an air valve and bypass valve, which combines their functions. Also, the liner can include an annular ridge extending into the combustion space for increasing residence time of the fuel/air mixture and combustion gases in the combustion space.

17 Claims, 12 Drawing Sheets

U.S. PATENT DOCUMENTS

| | | |
|---|---|---|
| 2,268,270 | 12/1941 | Traupel . |
| 2,446,059 | 7/1948 | Peterson . |
| 2,469,238 | 5/1949 | Newton . |
| 2,487,514 | 11/1949 | Boestade et al. . |
| 2,488,969 | 11/1949 | Dietler . |
| 2,489,939 | 11/1949 | Traupel . |
| 2,513,601 | 7/1950 | Traupel . |
| 2,608,822 | 9/1952 | Pavlecka et al. . |
| 2,620,626 | 12/1952 | Lysholm . |
| 2,621,475 | 12/1952 | Loy . |
| 2,625,012 | 1/1953 | Larrecq . |
| 2,663,141 | 12/1953 | Hage . |
| 2,675,673 | 4/1954 | Mallinson et al. . |
| 2,837,894 | 6/1958 | Kind . |
| 2,988,884 | 6/1961 | Pouit . |
| 2,999,359 | 9/1961 | Murray . |
| 3,088,279 | 5/1963 | Diedrich . |
| 3,091,080 | 5/1963 | Crim et al. . |
| 3,099,134 | 7/1963 | Calder et al. . |
| 3,204,406 | 9/1965 | Howes et al. . |
| 3,315,467 | 4/1967 | De Witt . |
| 3,407,596 | 10/1968 | Dasbach et al. . |
| 3,430,443 | 3/1969 | Richardson et al. . |
| 3,626,444 | 12/1971 | Caruel et al. . |
| 3,691,762 | 9/1972 | Ryberg et al. . |
| 3,739,576 | 6/1973 | Chamberlain . |
| 3,765,170 | 10/1973 | Nakamura . |
| 3,765,824 | 10/1973 | Trozzi . |
| 3,768,962 | 10/1973 | Baranowski, Jr. . |
| 3,851,466 | 12/1974 | Verdouw . |
| 3,869,865 | 3/1975 | Lacroix et al. . |
| 3,899,884 | 8/1975 | Ekstedt . |
| 3,905,192 | 9/1975 | Pierce et al. . |
| 3,906,718 | 9/1975 | Wood . |
| 3,958,413 | 5/1976 | Cornelius et al. . |
| 4,012,904 | 3/1977 | Nogle . |
| 4,030,288 | 6/1977 | Davis et al. . |
| 4,073,137 | 2/1978 | Roberts . |
| 4,192,139 | 3/1980 | Buchheim . |
| 4,193,260 | 3/1980 | Carlisle et al. . |
| 4,215,535 | 8/1980 | Lewis . |
| 4,242,863 | 1/1981 | Bailey . |
| 4,255,927 | 3/1981 | Johnson et al. . |
| 4,260,367 | 4/1981 | Markowski et al. . |
| 4,286,430 | 9/1981 | Smith . |
| 4,297,842 | 11/1981 | Gerhold et al. . |
| 4,301,657 | 11/1981 | Penny . |
| 4,305,255 | 12/1981 | Davies et al. . |
| 4,356,698 | 11/1982 | Chamberlain . |
| 4,389,848 | 6/1983 | Marowski et al. . |
| 4,412,414 | 11/1983 | Novick et al. . |
| 4,457,704 | 7/1984 | Sommers et al. . |
| 4,610,135 | 9/1986 | Alexander . |
| 4,641,495 | 2/1987 | Mowill . |
| 4,700,542 | 10/1987 | Wang . |
| 4,702,070 | 10/1987 | Cureton et al. . |
| 4,713,938 | 12/1987 | Willis . |
| 4,747,262 | 5/1988 | Maynard . |
| 4,766,721 | 8/1988 | Lizuka et al. . |
| 4,807,433 | 2/1989 | Maclin et al. . |
| 4,829,764 | 5/1989 | Lizuka et al. . |
| 4,838,029 | 6/1989 | Gleason et al. . |
| 4,845,944 | 7/1989 | Rodgers . |
| 4,845,952 | 7/1989 | Beebe . |
| 4,893,466 | 1/1990 | Egnell et al. . |
| 4,898,001 | 2/1990 | Kuroda et al. . |
| 4,928,481 | 5/1990 | Joshi et al. . |
| 4,944,149 | 7/1990 | Kuwata . |
| 4,966,001 | 10/1990 | Beebe . |
| 4,974,415 | 12/1990 | Shekleton et al. . |
| 5,016,443 | 5/1991 | Shimizu et al. . |
| 5,069,029 | 12/1991 | Kuroda et al. . |
| 5,070,700 | 12/1991 | Mowill . |
| 5,081,832 | 1/1992 | Mowill . |
| 5,121,608 | 6/1992 | Willis et al. . |
| 5,156,002 | 10/1992 | Mowill . |
| 5,214,911 | 6/1993 | Shekleton . |
| 5,218,824 | 6/1993 | Cederwall et al. . |
| 5,257,499 | 11/1993 | Leonard . |
| 5,351,474 | 10/1994 | Slocum et al. ............... 60/39.23 |
| 5,377,483 | 1/1995 | Mowill . |
| 5,611,196 | 3/1997 | Wilson . |

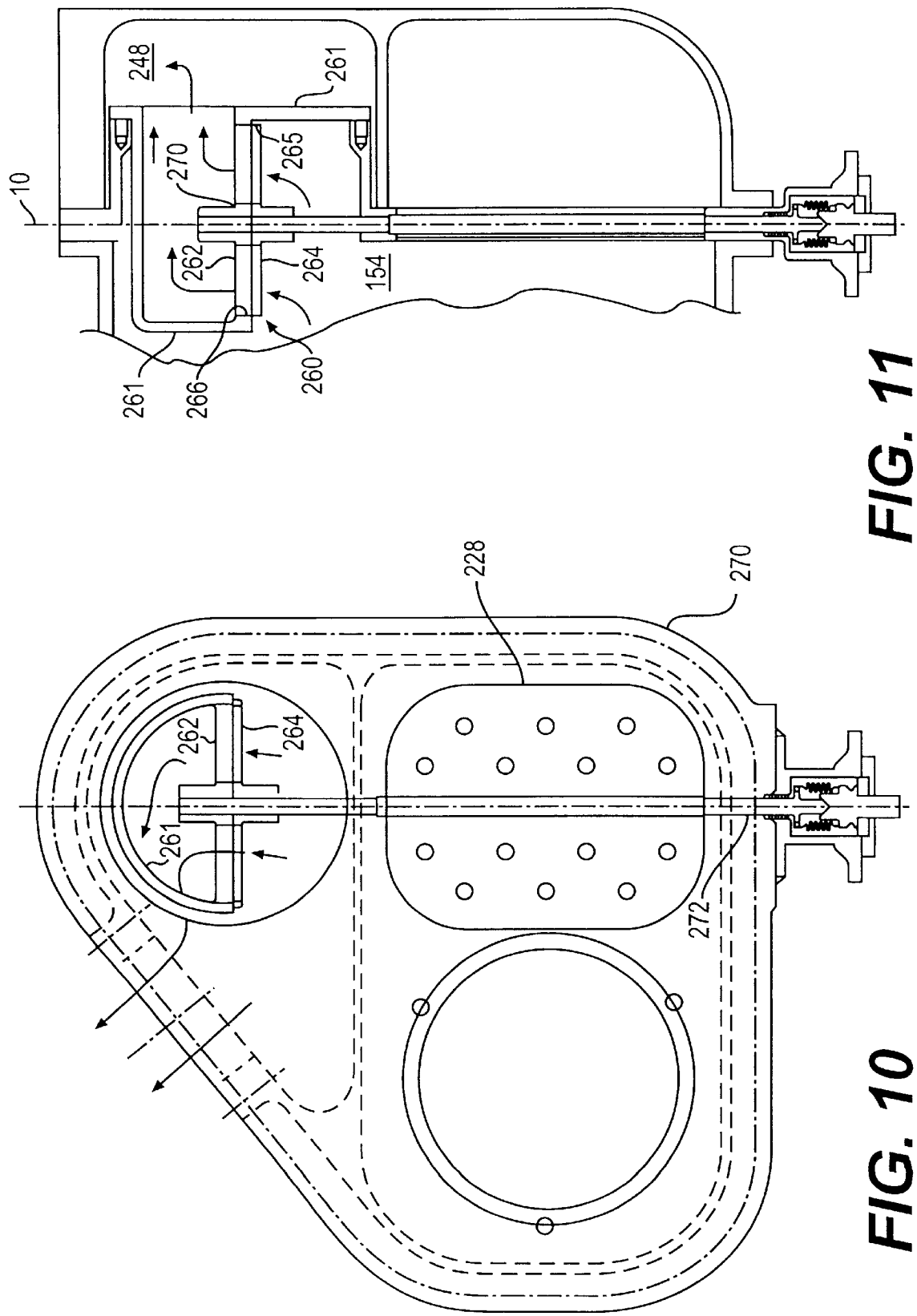

PREMIXER WITH DILUTION AIR BYPASS VALVE ASSEMBLY

This application claims a right of priority to the following U.S. provisional applications: application Ser. No. 60/021,920 filed Jul. 17, 1996 entitled AIR VALVE ASSEMBLY INCLUDING SPLIT-SHAFT AND SEAL ARRANGEMENT; application Ser. No. 60/022,241 filed Jul. 22, 1996 entitled COMBUSTOR FOR ULTRA LOW EMISSIONS GAS TURBINE APPLICATIONS; application Ser. No. 60/032,922 filed Dec. 6, 1996 entitled PREMIXER WITH DILUTION AIR BYPASS VALVE ASSEMBLY; and application Ser. No. 06/038,943 filed Mar. 7, 1997 entitled PREMIXER ASSEMBLY FOR LOW EMISSION GAS TURBINE APPLICATIONS.

BACKGROUND OF THE INVENTION

This invention relates to single stage, controllable fuel/air ratio combustors having fuel/air premixers for gas turbine engines. More particularly, this invention relates to combustors of the type having premixers with a bypass air valve system for affecting pressure and cooling conditions during idle or low load operations.

It is known from U.S. Pat. No. 5,377,483, for example, to utilize fuel/air premixers to provide a closely controlled fuel/air mixture in single stage combustors for gas turbine engines. The close control afforded by such combustor system premixers results in good mixing, controlled flame temperatures and low levels of $NO_x$, CO, and unburnt hydrocarbon emissions, as well as reduced losses due to the overall control of the compressed air inventory.

It is also known from the aforementioned patent that the close control of the fuel/air ratio can be advantageously achieved using a rotatable-type air valve located in the premixer to control the combustion air flow. In the referenced construction, the compressed air flow not used for combustion is used to convectively cool the combustion chamber liner before passing through dilution ports upstream of the turbine to be mixed with the combustion gases. This arrangement provides efficient use of the compressed air without disturbing the fuel/air ratio in the combustion zone.

However, for gas turbine applications requiring relatively high pressure ratios and turbine inlet temperatures, such as certain twin spool designs, the cooling air flow at idle load condition can be significantly greater than at full load, possibly leading to unacceptably high pressure drops or even choked flow conditions at the dilution ports or coolant passages. Such conditions, if they occur, can adversely affect compressor and overall cycle performance and, consequently, degrade operation and performance of the gas turbine. A cost effective solution, preferably one requiring a minimum of moving parts, is therefore needed to overcome or mitigate this potential problem.

SUMMARY OF THE INVENTION

In accordance with the invention, as embodied and broadly described herein, the low emissions combustor system for a gas turbine comprises a combustion chamber liner defining a combustion space for combusting a homogeneous fuel and compressed air mixture received through an inlet to produce combustion gases for delivery to the turbine through a liner exit. The liner has both principal dilution ports and secondary dilution ports adjacent and upstream of the liner exit, and a premixer assembly operatively connected to the liner for providing the fuel/air mixture. The premixer assembly includes an air valve for controlling the fuel/air ratio of the mixture. The combustor system also includes a compressed air supply plenum upstream of, and in flow communication with, the air valve. A shroud surrounds the liner and provides a cooling channel between the plenum and the principal dilution ports.

The combustor system still further includes a bypass channel between the plenum and the secondary dilution ports, and a bypass valve operatively positioned to control flow of compressed air from the plenum through the bypass channel. The bypass valve may take the form of a pressure-operated or pressure-activated poppet-type valve, or alternatively, a butterfly-type or damper-type bypass valve. Moreover, a single multi-port valve may be employed for regulating the flow of compressed air into the compressed air supply chamber (e.g., plenum) and the bypass channel in lieu of an air valve and bypass valve, which would combine their functions.

Preferably, the premixer assembly includes a mixing tube (e.g., venturi) connected to the liner inlet and oriented to deliver the fuel/air mixture into the combustion space. Additionally, the liner can further include an annular ridge extending into the combustion space for stabilizing residence time of the fuel/air mixture and combustion gases in the combustion space. The ridge can be an annular depression in the liner, and the shroud can include a vane extending into the cooling channel to deflect cooling air into the depression. It is also preferred that the cooling shroud includes vanes extending into the cooling channel and oriented to provide swirling flow and increased heat transfer from the liner in areas where additional cooling is needed.

The combustor system of this invention is less-complex than prior attempted solutions and provides relatively low emissions for a wide range of gas turbine applications including those with relatively high turbine inlet temperature relative to the desired flame temperature.

Other advantages of the invention will be set forth in part in the description which follows, and in part will be apparent from the description, or may be learned by the practice of the invention. The advantages of the invention may be realized and attained by means of the instrumentalities and combinations particularly pointed out in the appended claims.

BRIEF DESCRIPTION OF THE DRAWINGS

The accompanying drawings, which are incorporated in and constitute part of the specification, illustrate preferred embodiments of the invention and, together with a description, serve to explain the principles of the invention.

In the drawings:

FIG. 6a is an enlarged view of a portion shown in FIG. 6;

FIG. 10 is a cross-section showing a portion of another assembly usable with the combustor system shown in FIG. 1;

FIG. 11 is a cross-sectional view of FIG. 10;

DESCRIPTION OF THE PREFERRED EMBODIMENTS

Reference will now be made to the present preferred embodiments of the invention, which are illustrated in the accompanying drawings.

The present invention is preferably utilized with a combustor system, such as the one made in accordance with the teachings in U.S. Pat. No. 5,377,483 (the complete disclosure of which is hereby incorporated by reference). Generally, the preferred engine module for which the present invention is designed includes a centrifugal compressor for supplying compressed air to a premixer system; an air valve for regulating the flow of compressed air; a compressed air supply plenum upstream and in flow communication with the air valve; a single-stage combustor system in communication with the premixer system (including one or more premixers); and a mixing tube for further mixing the fuel and compressed air and delivering the resulting mixture to a combustion zone within a combustor system. Further, the combustor system includes a combustion chamber liner that defines the combustion zone or space for combusting the fuel and compressed air mixture received through a liner inlet, and also provides a liner exit for delivering the combustion gases to a turbine. Also, the liner has principal dilution ports and secondary dilution ports that are respectively adjacent and upstream of the liner exit and allow the delivery of additional compressed air into the combustor system.

Figure 1:
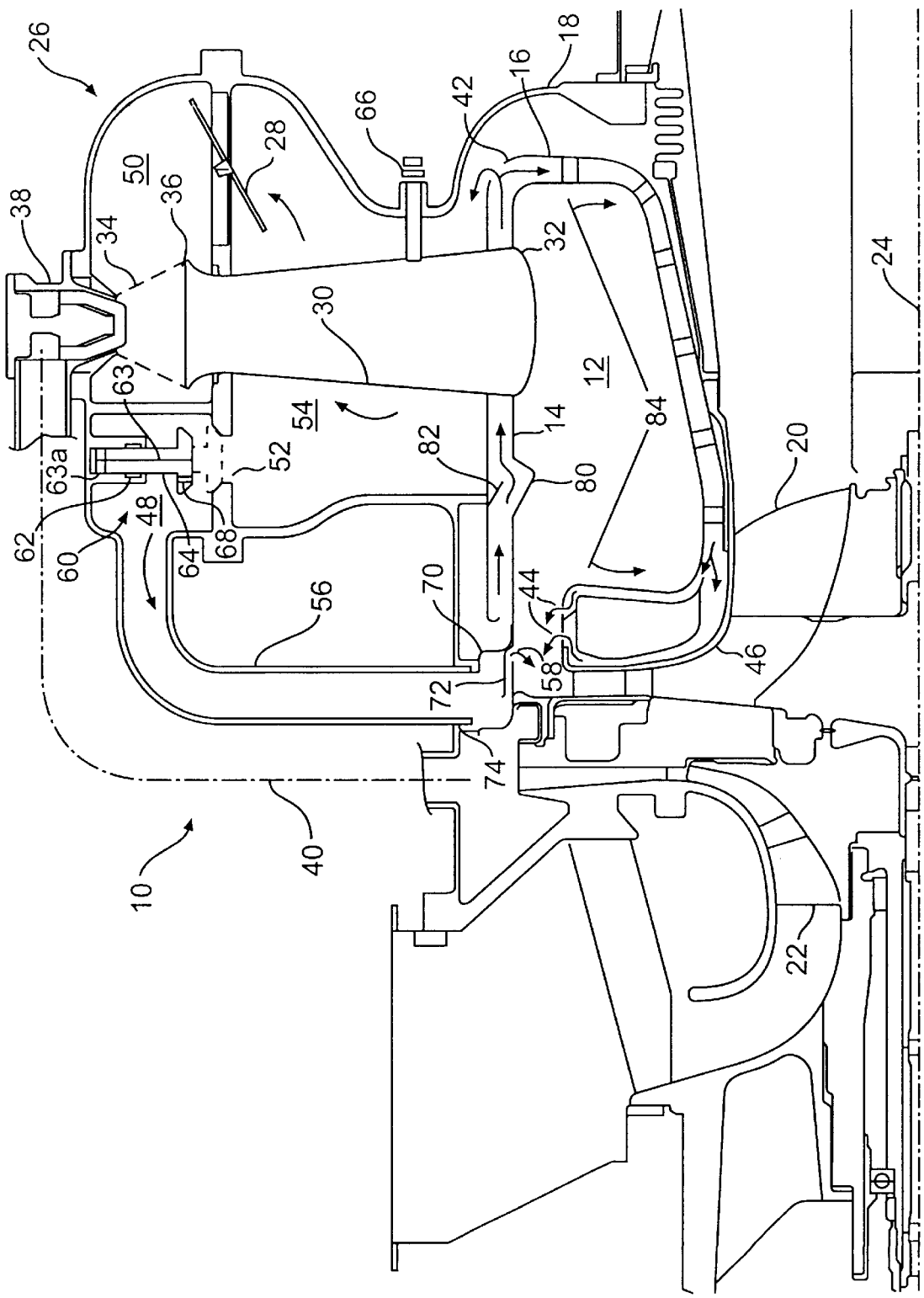
FIG. 1 is a diagrammatic cross-section of a combustor system that utilizes the present invention.

As embodied herein and with reference to FIG. 1, a combustor system is designated generally by the numeral 10. Combustor system 10 includes an annular combustion chamber 12 defined by a combustion chamber liner/housing 14. Around liner 14 is disposed in spaced relation a cooling shroud 16 and a pressure housing 18, as would be understood from the disclosure in U.S. Pat. No. 5,377,483. Combustion chamber liner 14 is designed to surround a gas turbine spool assembly, which can include a turbine 20 and a centrifugal compressor element 22 for rotation about an axis 24.

Figure 2:
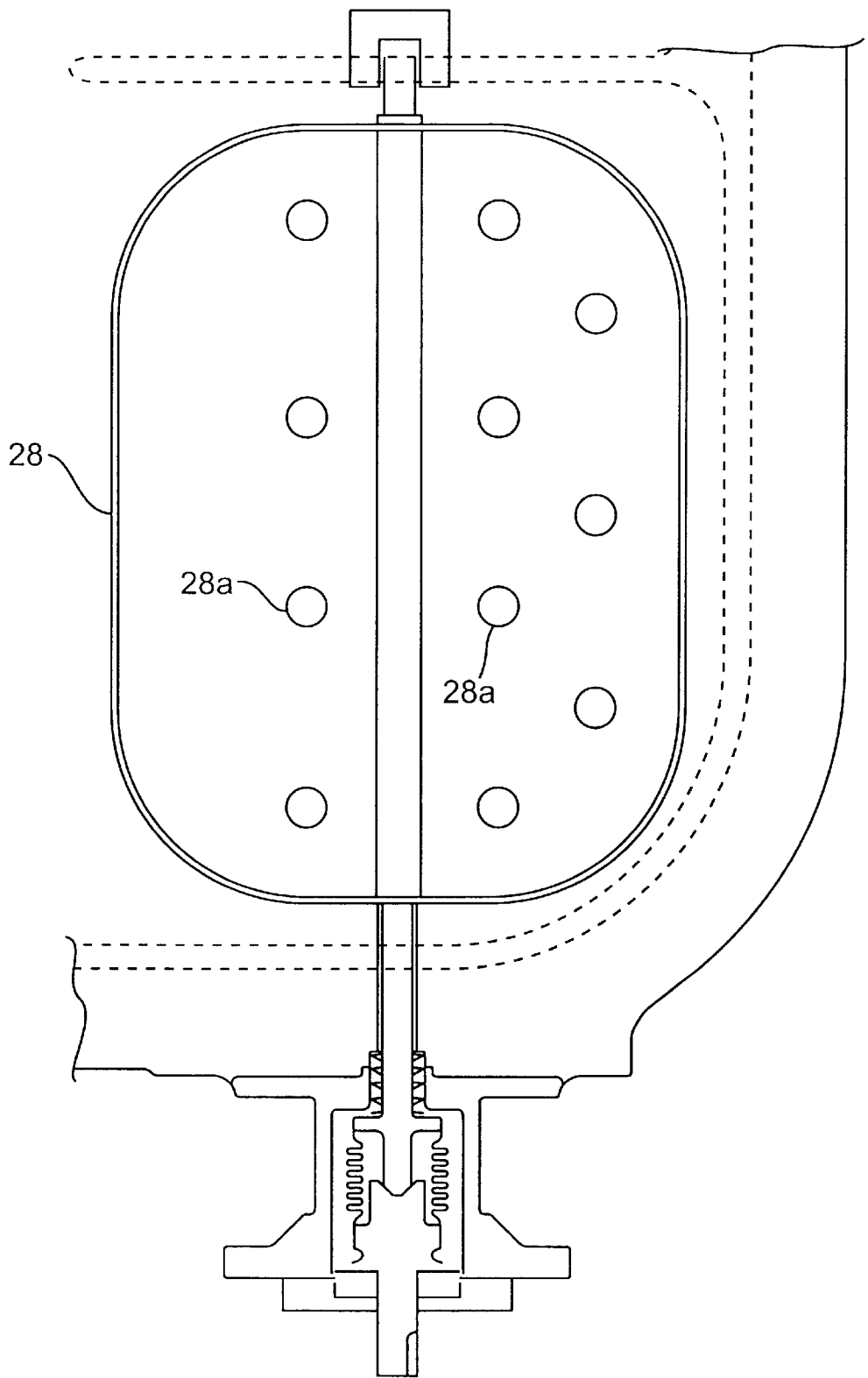
FIG. 2 is a cross-section showing a portion of an assembly usable with the combustor system shown in FIG. 1.

FIG. 1 also shows a premixer assembly 26 including an air valve 28 of the butterfly-type (see FIG. 2) and a mixing tube 30 having an exit 32 disposed to deliver a fuel/air mixture into combustion chamber 12 relative to axis 24 for reasons discussed in detail in U.S. Pat. No. 5,377,483. Air valve 28 regulates the flow of compressed air into a premixer assembly chamber 50 from a compressed air supply plenum 54, which receives compressed air from compressor 22. Also enclosed within premixer assembly 26 is a perforated flow smoothing element 34 surrounding a mixing tube inlet 36 and an outlet of fuel nozzle assembly 38. Fuel nozzle assembly 38 delivers a spray of fuel into the mixing tube inlet region where it is mixed with compressed air flowing through the perforated screen member 34 from chamber 50 in an amount controlled by air valve 28. Fuel nozzle assembly 38, which can be a multi-port type (e.g., one that accommodates liquid and/or gaseous fuels fed alternatively, sequentially, or concurrently), can include an "air blast" type nozzle using a small amount of compressed air fed directly from the outlet of compressor 22 via a conduit 40 (depicted schematically by dotted path).

In accordance with the present invention, a cooling shroud surrounds the liner and defines with the liner a cooling channel between the compressed air supply plenum and the principal dilution port. As embodied herein and with continued reference to FIG. 1, during operation, the compressed air provided by compressor 22 flows to the region between the cooling shroud 16 and the radially outer portion of combustor liner 14 where it divides, with one part flowing through apertures 42 leading to premixer assembly 26, and another part through the remaining cooling channels or passages defined by cooling shroud 16 and combustion liner 14. This latter part eventually passes through principal dilution ports 44 to mix with the combustion gases. As depicted in FIG. 1, combustor liner 14 can be configured to direct a portion of the cooling air flow in a path closely adjacent turbine shroud 46 to provide additional cooling before passing through principal dilution ports 44 which meter the cooling flow.

Figure 3:
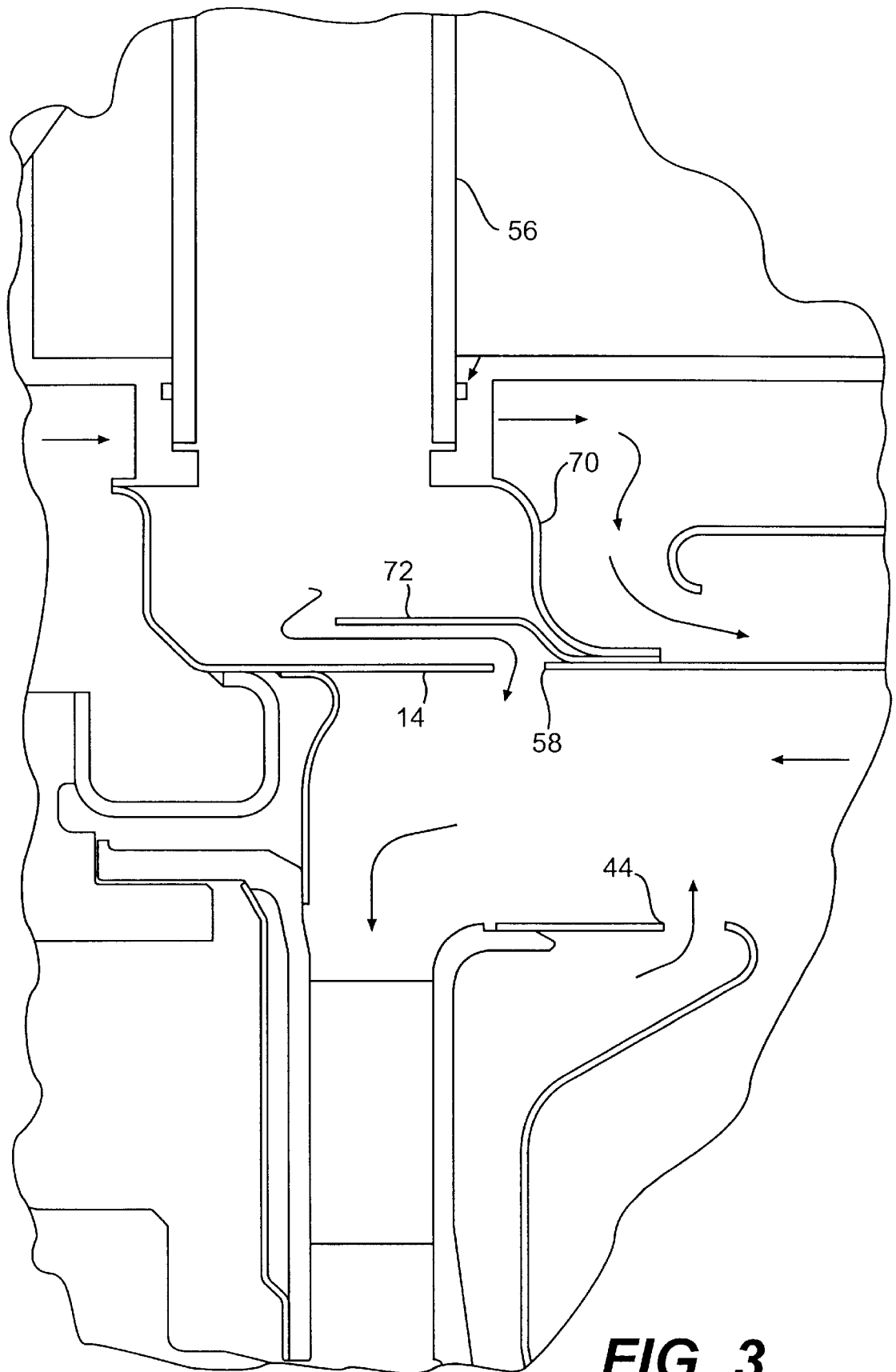
FIG. 3 is an enlarged schematic cross-section of a portion of the combustor system shown in FIG. 1.

In accordance with the present invention, a bypass channel controlled by a bypass valve is provided as an alternate flow path for the excess air not used for combustion. Compressed air can be directed from the plenum to the combustor system through the bypass channel and the secondary dilution ports into the turbine. As embodied herein and with continued reference to FIG. 1, premixer assembly 26 is configured to provide a bypass chamber 48 sealed off from plenum 54. Bypass chamber 48 includes an aperture 52 that flow connects chamber 48 to plenum 54. Also flow connected to chamber 48 is a bypass channel or conduit 56, which leads to second dilution ports 58 in combustor liner 14. Secondary dilution ports 58 are positioned downstream of principal dilution ports 44 relative to the flow direction of the combustion gases, as seen in FIG. 3.

It should be noted that secondary dilution ports 58 are located downstream of the combustion gases already diluted by air from the principal dilution ports in order to reduce the effects of thermal exposure (which include fatigue) on the ports 58 and associated structure surrounding the port openings. During full load operations, there is generally only a small amount of cooling air flowing through secondary dilution ports 58, and as a consequence the combustion gases flowing by secondary dilution ports 58 may negatively affect joint connections, adjacent surfaces and the like of the ports. Accordingly, the secondary dilution ports are located relatively away from the combustion zone of the combustor, and downstream of the principal dilution ports 44, in order to benefit from the reduced cooling of the combustion gases, thereby mitigating thermal exposure.

Figure 4:
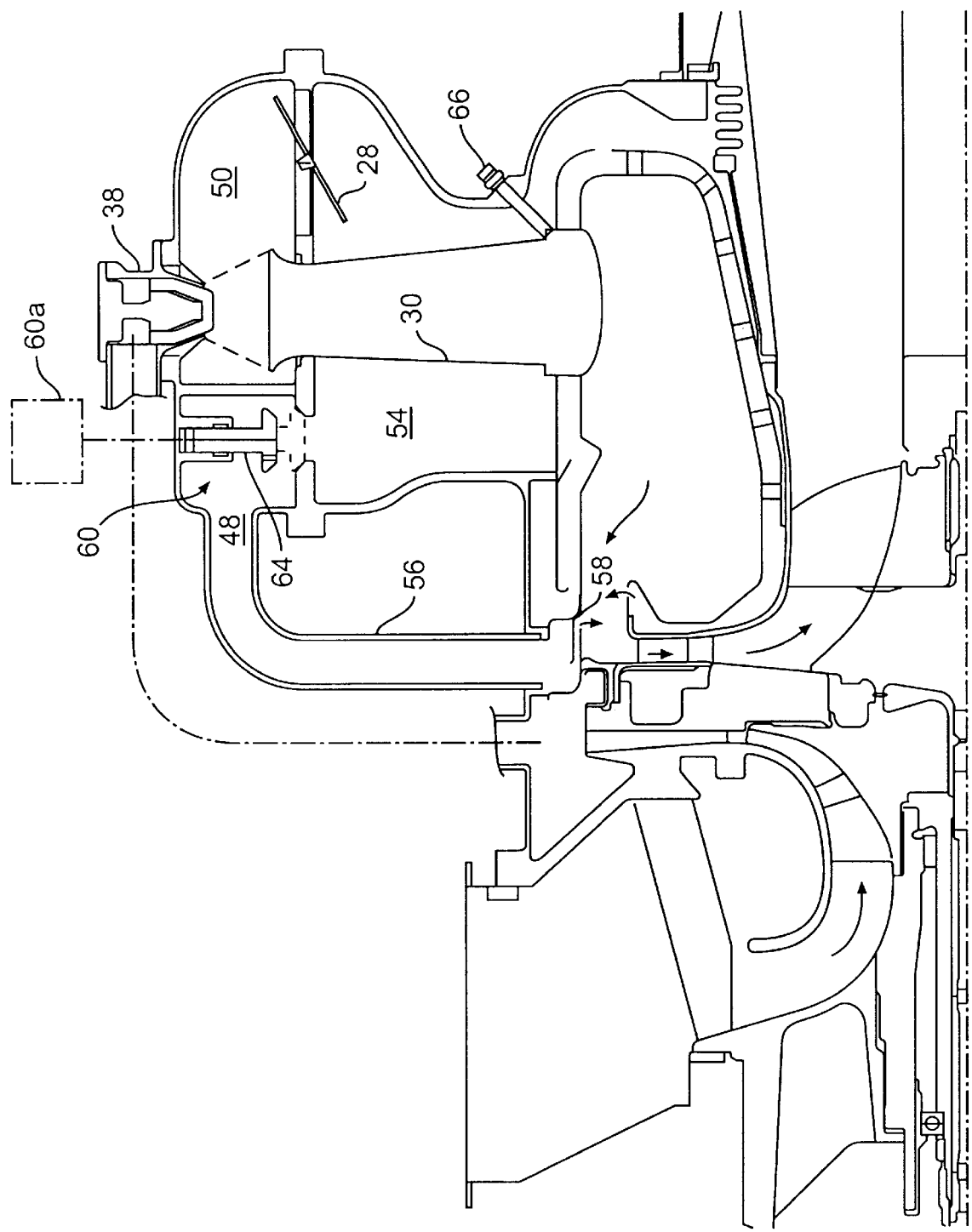
FIG. 4 is a diagrammatic cross-section of an alternate combustor system that utilizes the present invention.

Further embodied herein and with continued reference to FIG. 1, a pressure-operated bypass valve 60 mounted in premixer assembly 26 is used to control the flow of compressed air from plenum 54 through aperture 52 into bypass chamber 48. As depicted, bypass valve 60 is a spring loaded poppet-type valve that can be damped by friction-type mechanical damper 62 acting along the interface between the valve stem and the housing wall of premixer assembly 26. Alternatively, or additionally, bleed channel 63 can be provided in the stem interconnecting chamber 48 and a closed space at the rear of the valve stem to prevent undue oscillations. A changeable orifice plate 63a can be used to control flow through channel 63. Spring 64 of pressure-operated bypass valve 60 can be calibrated or adjusted with shims to provide "lift-off" whenever the pressure in plenum 54 exceeds a predetermined level. In a further embodiment depicted in FIG. 4, bypass valve 60 may be of a pressure activated variety that relies on an alternate actuator 60a that is responsive to a pressure sensor to operate the valve (e.g., via a solenoid).

The operation of bypass valve 60 is dependent upon the pressure in plenum 54. During idle or low load conditions for the combustor system, air valve 28 is maintained in a closed position and prevents air from entering chamber 50 (except for a minimum flow of air that passes through bleed holes 28a shown in FIG. 2). During this period, the compressed air flowing into plenum 54 would normally create a pressure front at apertures 42 such that substantially all of the compressed air is directed between cooling shroud 16 and liner 14 to principal dilution holes 44. As a consequence, the amount of cooling or dilution air increases to a maximum percentage of total air flow, which may adversely choke the primary dilution ports. The present invention provides for the bypass valve to open at high pressure conditions in plenum 54 during the low load or idle conditions.

Figure 5:
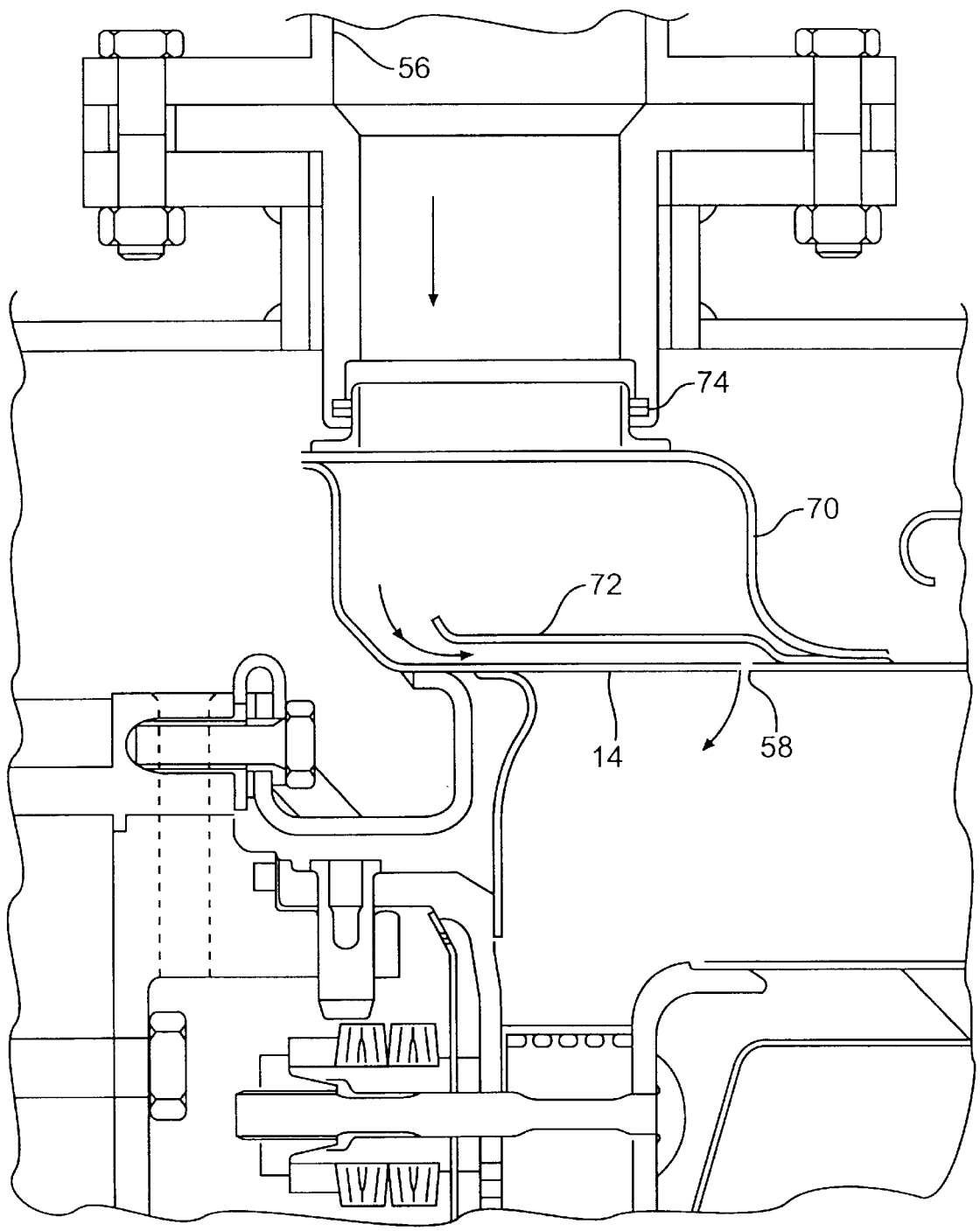
FIG. 5 is an enlarged schematic cross-section of a portion of the combustor system shown in FIG. 1.

When the bypass valve 60 opens, a portion of the compressed air will bypass the "full load" cooling path and principal dilution ports 44 by flowing through the bypass channel, namely bypass chamber 48, bypass conduit 56, and secondary dilution ports 58. As shown in FIG. 1 and 5, secondary dilution ports 58 are fed through annular manifold 70, which is flow-connected to bypass conduit 56 and may comprise several, angularly spaced conduit members. Diverter shroud 72 is spaced from liner 14 to create higher flow velocities and thus increased cooling for the liner portions adjacent dilution ports 58. When the bypass valve 60 is closed, hole 68 permits a very small amount of air flow through bypass valve 60 to secondary dilution ports 58 in order to provide a some cooling. Also shown in FIG. 5, are sealing rings 74 which are provided for accommodating liner expansion.

Figure 6:
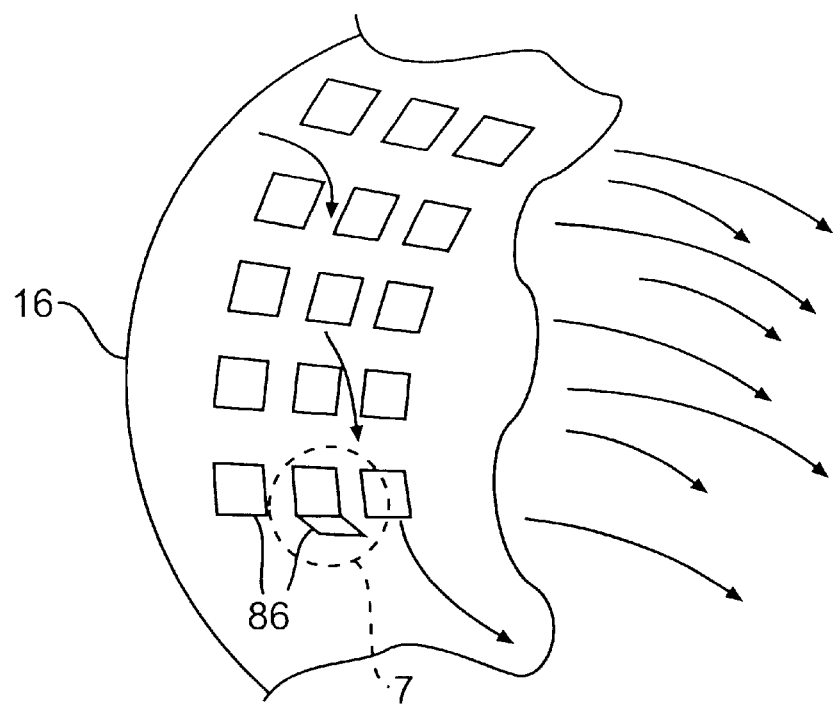
FIG. 6 is an illustration of another portion of the combustor system of FIG. 1.
Figure 7:
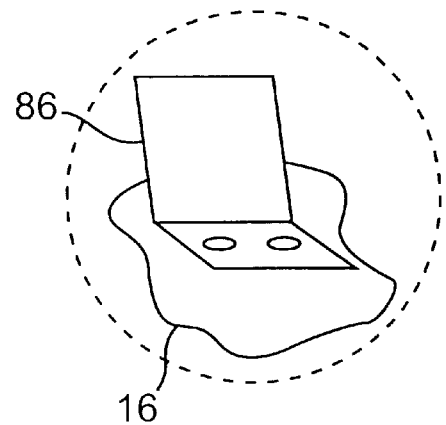
FIG. 7 is an illustration of a portion shown in FIG. 6.

Further in accordance with the present invention, the liner includes an annular ridge extending into the combustion space for increasing residence time of the fuel/air mixture and combustion gases in the combustion space by providing a small pressure drop. The ridge is an annular depression in the liner and the shroud includes an annular vane positioned to deflect cooling air into the depression. Also, parts of the cooling shroud may include vanes extending into the cooling channel and oriented to provide swirling flow of the cooling air. As embodied herein and with continued reference to FIG. 1, as well as FIGS. 6 and 7, ridge 80 is provided in liner 14 in order to stabilize the combustion pattern and to extend the residence time. Further, ridge 80 is provided in the form of a radial depression in liner 14, thereby allowing cooling air to pass into ridge 80 by annular vane 82 provided on shroud 16 without impairing the assembly of the combustion chamber liner. As a result, combustion chamber volume, surface and hence overall cooling is reduced. Notably, improved cooling is particularly important in the radially inner region of annular liner 14 encompassed by the arc shown by 84. Also ridge 80 provides the further advantage of increased stiffness to liner 14. In order to extend the cooling effectiveness in the above mentioned arc, where only a part of the air passes (the rest having already been diverted to combustion through apertures 42), vanes 86 could be provided, such as by welding on the inner surface of cooling shroud 16, in order to impose a swirling flow of the cooling air without the need to provide a much more costly extended surface geometry to liner 14 itself. See FIG. 6 and detail in FIG. 6a. Moreover, as seen in FIG. 7, vanes 86 may be oriented at an angle to the flow of compressed air (generally shown with arrows) in order to achieve increased cooling, or alternatively parallel to the flow of air in order to straighten the transiting compressed air prior to passing through the principal dilution ports.

The system described will provide low emissions at all power ratings for high inlet temperature gas turbine applications while keeping variable geometry flow apparatus away from and outside the hot combustor area.

Figure 9:
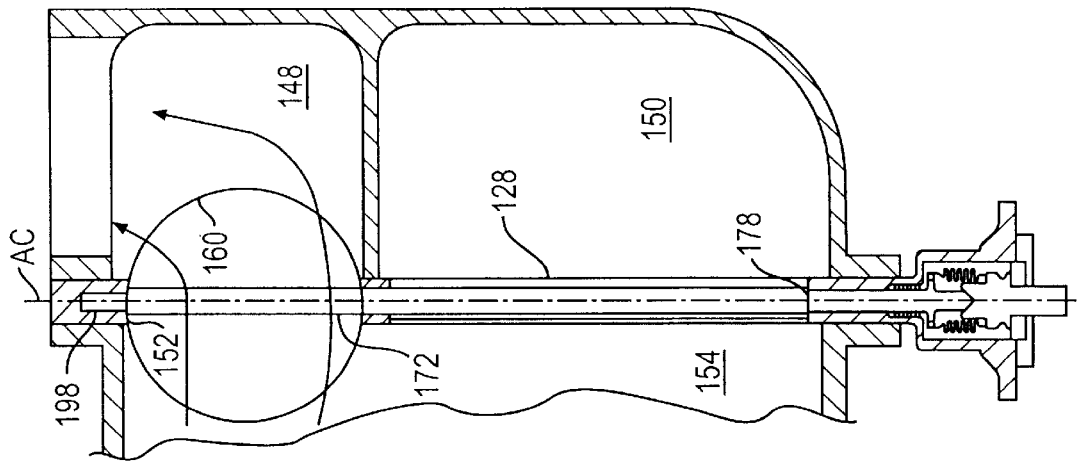
FIG. 9 is a cross-sectional view of FIG. 8.
Figure 8:
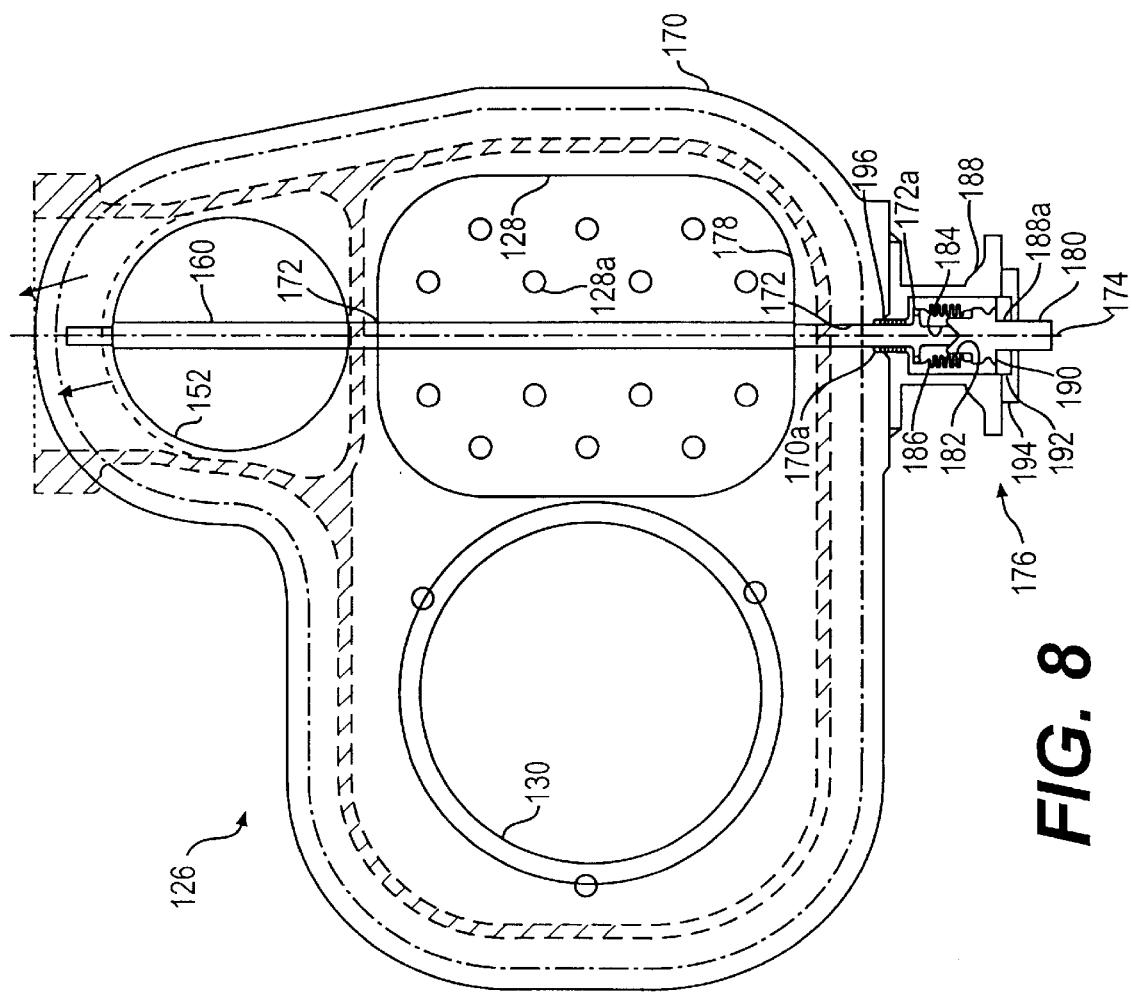
FIG. 8 is a cross-section showing a portion of another assembly usable with the combustor system shown in FIG. 1.

Further in accordance with the present invention, a rotatable bypass valve design may be utilized with the combustor system in lieu of a pressure-operated or pressure-activated bypass valve. As embodied herein and shown in FIGS. 8 and 9, a butterfly-type bypass valve 160 is depicted for providing and regulating an alternate flow path for the excess air not used for combustion. As illustrated, a premixer assembly 126 (partial view only) is configured to provide a bypass chamber 148 capable of being sealed off by butterfly-type bypass valve 160 from a chamber 150, a plenum 154, a butterfly-type air valve 128, and a mixing tube (mixing tube aperture 130 shown). Flow connected to chamber 148 is a bypass conduit (not shown), which leads to a second set of dilution ports in the combustor liner (also not shown).

Butterfly-type bypass valve 160 is disposed in an aperture 152 that is normal to the plane of a support plate 170, and is further mounted on a shaft 172 for rotatable motion about an axis 174 by a shaft assembly 176. Collinear to butterfly-type bypass valve 160 (and similarly mounted on shaft 172 for rotatable motion about axis 174) is butterfly-type air valve 128 also disposed in an aperture 178 that is normal to the plane of support plate 170. Butterfly-type bypass valve 160 and butterfly-type air valve 128 are preferably mounted on rotatable shaft 172 at a 90 degree offset. That is, as shown diagrammatically in FIGS. 8 and 9, valves 128, 160 are positioned such that when one valve is "closed" in order to obstruct air flow, the other is "open" allowing air to flow by into the respective adjoining chamber 150, 148, and vice-versa. Consequently, during low load or idle conditions, butterfly-type air valve 128 will be closed, or substantially obstructing the flow of air to the premixer assembly, and butterfly-type bypass valve will be open (or substantially so), thereby allowing the flow of compressed air to the secondary dilution ports.

Valves 128, 160 are rotated by shaft assembly 176. Shaft assembly 176 includes an actuator shaft 180 having an engagement end 182 in abutting contact with a bearing end 184 of shaft 172. A bellows coupling 186 interconnects shaft 172 at a flange 172a and actuator shaft 180. A coupling housing 188 is provided to surround shaft bearing end 184, actuator shaft engagement end 182, and bellows coupling 186. Coupling housing 188 is provided with aperture 188a through which actuator shaft 180 extends to be connected to a source of rotary motion (not shown). Also, disposed between housing 188 and an annular face 190 of actuator shaft engagement end 182 is a face seal 192, which is preferably made of a high temperature material with a low coefficient of friction. An end cap 194 of coupling housing 188 can be made axially adjustable, such as by a threaded sealing attachment, to accurately position face seal 192 and actuator shaft engagement end 182 relative to support plate 170 to insure accurate positioning of valves 128, 160.

Still further, the principal preload or seating force between shaft bearing end 184 and actuator shaft engagement end 182 is provided by a coil spring 196 disposed between shaft flange 172a and a recessed portion 170a of valve support plate 170. Also in valve support plate 170 is a bearing recess portion 198 that provides a bearing surface for shaft 172 to rotate within.

Although butterfly-type bypass valve 160 is generally circular, other shapes, such as rectangular and elongated along the axis of rotation 174, are possible. Moreover, while butterfly-type air valve 128 is generally shown with a plurality of orifices or bleed holes 128a, bypass valve 160 may also operate with such holes in order to impart compressed air for cooling to the bypass conduit.

Further in accordance with the present invention, a damper-type bypass valve may be utilized for providing and regulating an alternate flow path for the excess air not used for combustion. As embodied herein and shown in FIGS. 10 and 11, a damper-type bypass valve 260 generally includes two components: a static member 262 and a rotating member 264. Static member 262 is mounted in a bypass plate 261 of a support plate 270, and provides a bearing mount 271 for an actuator shaft 272 to rotate within. Rotating member 264 is operatively connected to actuator shaft 272 and interfaces with static member 262. Both static member 262 and rotating member 264 contain apertures 266, 268, respectively, that create a flow path from a plenum 254 to a chamber 248, which is flow connected to secondary dilution ports (not shown).

The flow path is selectively created by the movement of actuator shaft 272, which causes rotating member 264 to turn bringing apertures 266, 268 into communication, thereby allowing air from plenum 254 into chamber 248. Apertures 266, 268 are oriented so that the flow path is created when butterfly-type air valve 228 is generally in its "closed" position. When butterfly-type air valve is actuated by shaft 272 into generally its "open" position, rotating member 264 is simultaneously turned causing apertures 266, 268 to be out of phase from each other, and thereby disrupting the flow path from plenum 254 to chamber 248.

Damper bypass valve 260 is generally circular, but other shapes and variations are possible. Moreover, while butterfly-type air valve 228 is generally shown with a plurality of orifices or bleed holes 228a, bypass valve 260 may also function with such holes in order to impart compressed air to a bypass conduit (not shown).

Figure 12:
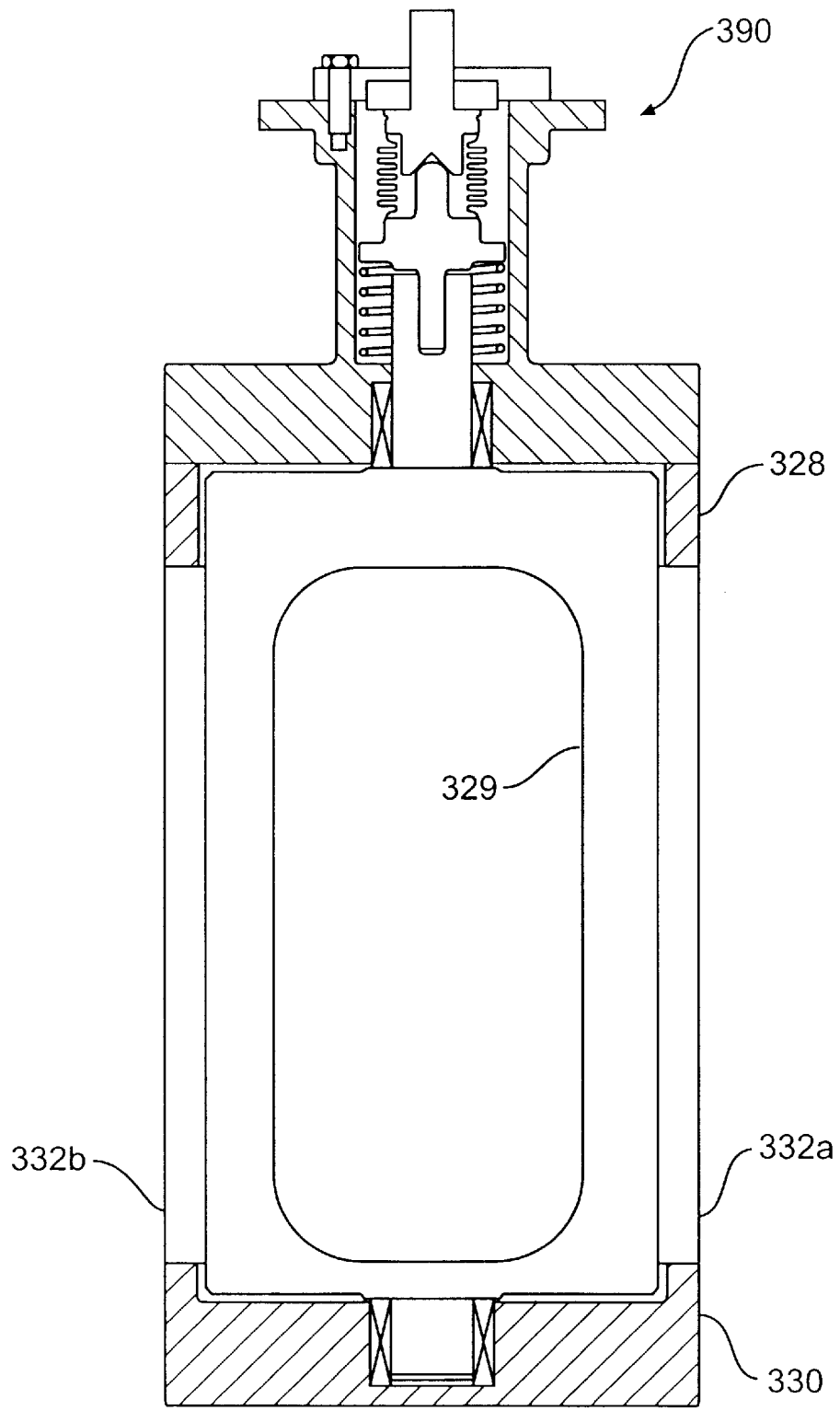
FIG. 12 is a cross-section showing a portion of another assembly usable with the combustor system shown in FIG. 1.
Figure 12A:
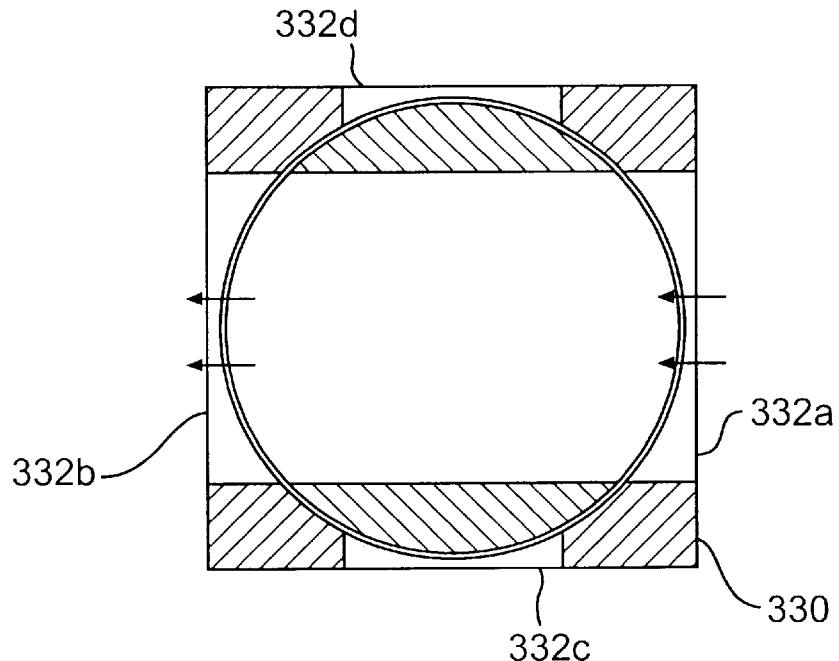
FIGS. 12a, 12b, 12c, and 12d are cross-sectional views of FIG. 12.
Figure 12B:
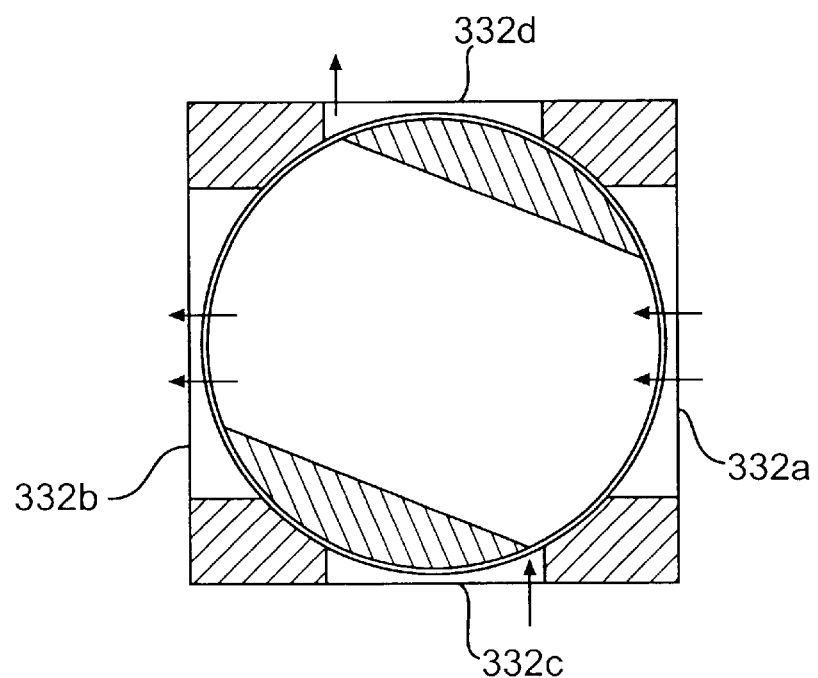
Figure 12C:
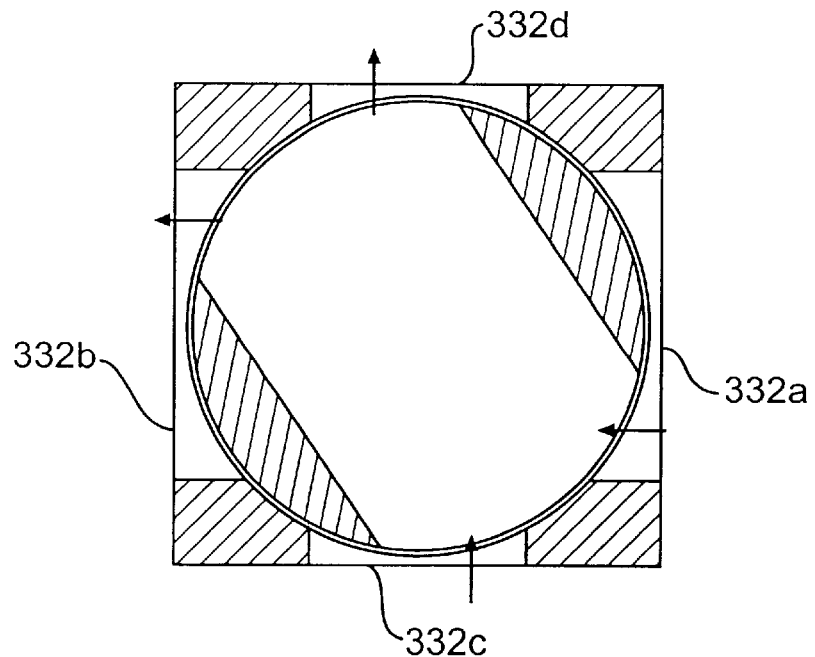
Figure 12D:
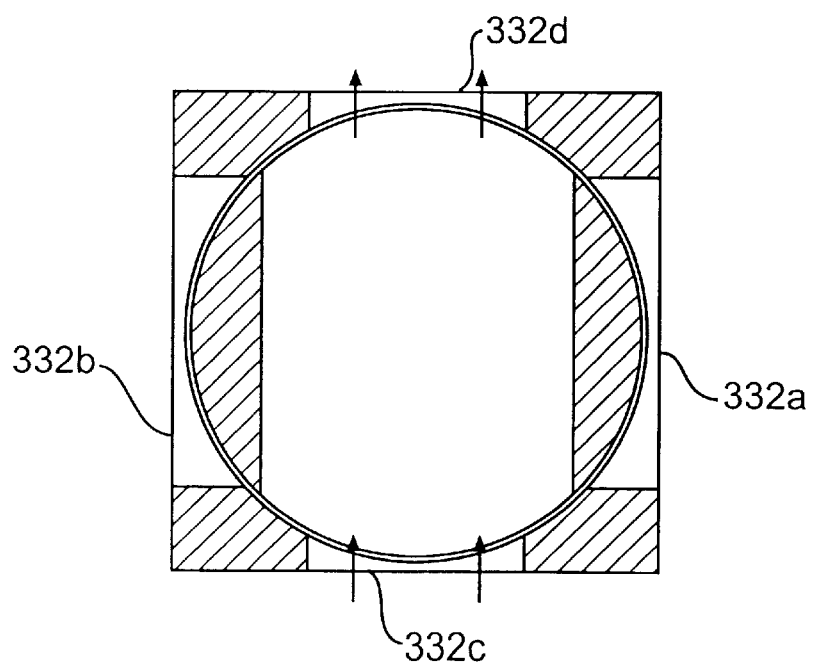

Further accordance with the present invention, the premixer assembly can include a combination air and bypass valve for controlling the flow of compressed air. As embodied herein and partially shown in FIGS. 12 through 12d, a combination air and bypass valve 328 is positioned upstream of the premixer assembly and is in communication with a chamber and a bypass chamber (as illustrated in FIG. 1), and is used in lieu of two separate valves for controlling the flow of compressed air to the mixing tube and secondary dilution ports, and to further provide a securely situated valve as described earlier. Valve 328 is cylindrical in shape having a passageway 329, and is actuated by a split-shaft assembly 390 at intervals set by a controller (not shown) corresponding to the load conditions of the gas turbine. During operation, and depending on the load conditions, compressed air may be directed to a mixing tube inlet or secondary dilution ports, or a combination thereof.

Valve 328 rotates within a housing 330, having twin, opposing apertures 332a, 332b, 332c, 332d. Apertures 332a and 332c are in flow communication with the compressor, aperture 332b is in flow communication with a chamber of similar design as chamber 50 of FIG. 1, and aperture 332d is in flow communication with a bypass chamber of similar design as bypass chamber 48 of FIG. 1. Although not expressly configured in the present drawings, one skilled in the art can appreciate how the premixer assembly may be reconfigured to accommodate the geometry of valve 328 and housing 330. Valve 328 is of a rotating type that allows the delivery of compressed air to the mixing tube inlet under full load conditions (e.g., FIG. 12a), to secondary dilution ports under idle conditions (e.g., 12d), or to both (e.g., FIGS. 12b and 12c). It should be further noted that valve 328 is not sealed within housing 330, and that no matter the orientation of valve 328, some compressed air is always flowing (if not seeping) to the mixing tube inlet and the secondary dilution ports.

Figure 13:
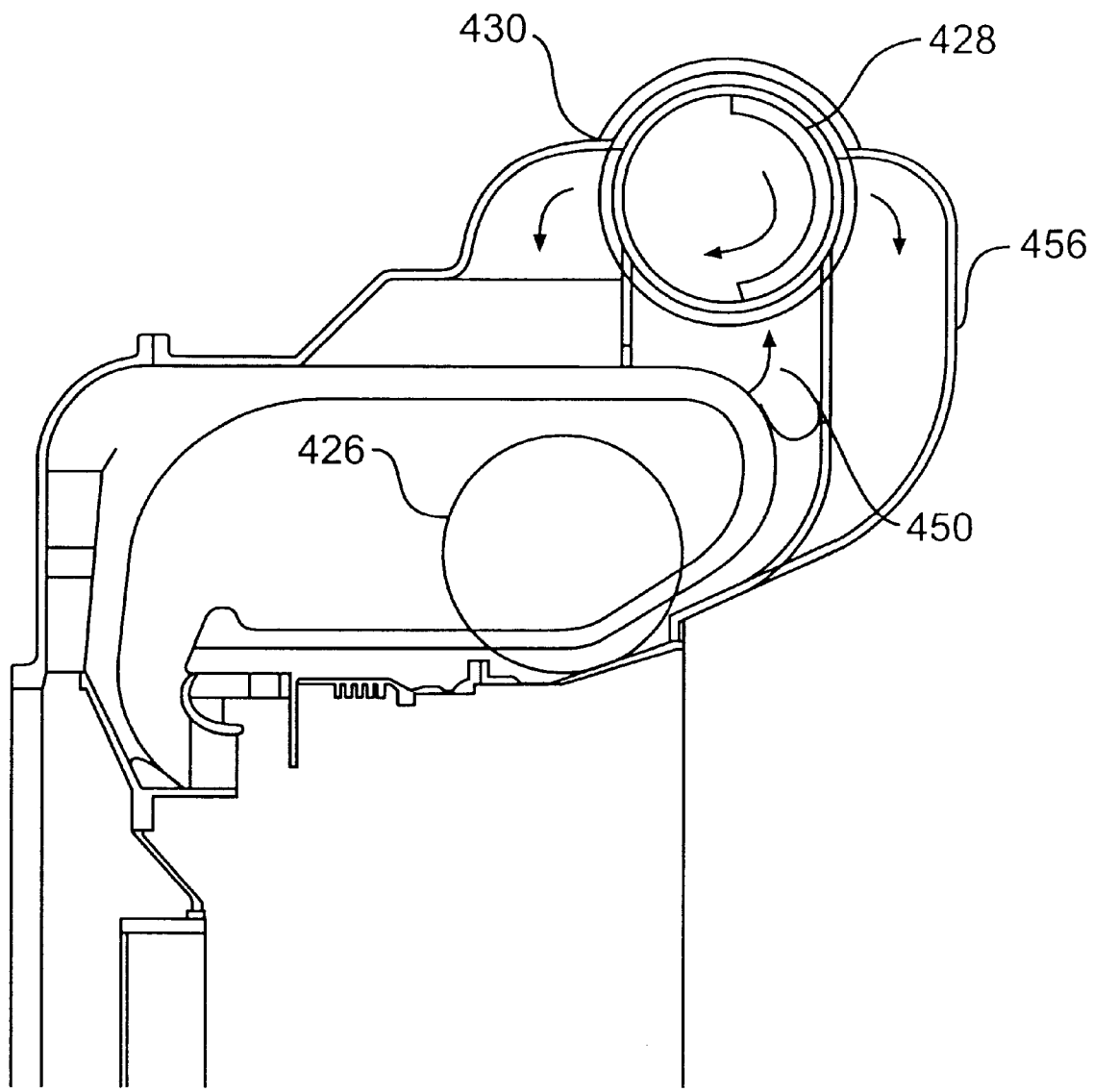
FIG. 13 is a cross-section showing a portion of another assembly usable with the combustor system shown in FIG. 1.

It should be further noted that valve 328 may include a variety of designs that utilizes a member for directing the flow of air for multiple directions depending on the orientation of a rotating element in a housing, as exemplified by rotating valve 428 of FIG. 13. Valve 428 is a half-moon design, which rotates within a housing 430, and is in communication with a plenum 454, and is capable of directing compressed air from plenum 454 to a premixer 426 and/or bypass conduit 456 feeding the secondary dilution ports.

With the above detailed description of the annular combustor system of the present invention, those skilled in the art would appreciate that modifications may be made to the invention without departing from its spirit. Therefore, it is not intended that the scope of the invention be limited to the specific embodiments illustrated and described above. Rather, it is intended that the scope of this invention be determined by the appended claims and their equivalents.

What is claimed is:

1. A low emissions combustor system for a gas turbine comprising:
    a combustion chamber liner defining a combustion space for combusting a fuel and compressed air mixture received through an inlet to produce combustion-gases for delivery to the turbine through a liner exit, said liner having both a principal dilution port and a secondary dilution port adjacent and upstream of said liner exit;
    a premixer assembly operatively connected to said liner for delivering the fuel/air mixture, said premixer assembly including an air valve for controlling the fuel/air ratio of the mixture;
    a compressed air supply plenum upstream of and in flow communication with said air valve;
    a shroud at least partly surrounding said liner and defining with said liner a cooling channel between said plenum and said principal dilution port;
    a bypass channel between said plenum and said secondary dilution port; and
    a bypass valve operatively positioned to control flow in said bypass channel.

2. The combustor system as in claim 1, wherein said bypass valve is part of said premixer assembly.

3. The combustor system as in claim 2, wherein said bypass valve is a poppet valve.

4. The combustor system as in claim 2, wherein said bypass valve is a butterfly valve.

5. The combustor system as in claim 2, wherein said bypass valve is a damper valve.

6. The combustor system as in claim 2, wherein an actuator shaft is operatively connected to said bypass valve and said air valve.

7. A low emissions combustor system for a gas turbine comprising:

a combustion chamber liner defining a combustion space for combusting a fuel and compressed air mixture received through an inlet to produce combustion gases for delivery to the turbine through a liner exit, said liner having both a principal dilution port and a secondary dilution port adjacent and upstream of said liner exit, said secondary dilution port located downstream of said principal dilution port;

a premixer assembly operatively connected to said liner for delivering the fuel/air mixture, said premixer assembly including an air valve for controlling the fuel/air ratio of the mixture;

a compressed air supply plenum upstream of and in flow communication with said air valve;

a shroud at least partly surrounding said liner and defining with said liner a cooling channel between said plenum and said principal dilution port;

a bypass channel between said plenum and said secondary dilution port; and a bypass valve operatively positioned to control flow in said bypass channel.

8. The combustor system as in claim 7 wherein said bypass valve is a poppet valve.

9. The combustor system as in claim 7, wherein said bypass valve is a butterfly valve.

10. The combustor system as in claim 7, wherein said bypass valve is a damper valve.

11. The combustor system as in claim 3 or 8, wherein said poppet valve is responsive to the pressure in said air supply plenum.

12. The combustor system as in claim 2 or 7, wherein a controller for sensing and monitoring pressure is in communication with said air supply plenum and an actuator for operating said poppet valve.

13. The combustor system as in claim 7, wherein said liner has an annular shape, wherein said premixer assembly includes a mixing tube connected to said liner inlet and oriented to deliver the fuel/air mixture for spiral flow in the combustion space; and wherein said liner further includes an annular ridge extending into the combustion space for increasing residence time of the fuel/air mixture and combustion gases in the combustion space.

14. The combustor system as in claim 13, wherein said ridge is an annular depression in said liner and wherein said shroud includes an annular vane positioned to deflect cooling air into said depression.

15. The combustor system as in claim 7, wherein said cooling shroud includes vanes extending into said cooling channel and oriented to provide swirling flow of the cooling air.

16. A low emissions combustor system for a gas turbine comprising:

a combustion chamber liner defining a combustion space for combusting a fuel and compressed air mixture received through an inlet to produce combustion gases for delivery to the turbine through a liner exit, said liner having both a principal dilution port and a secondary dilution port adjacent and upstream of said liner exit, said secondary dilution port located downstream of said principal dilution port;

a premixer assembly operatively connected to said liner for delivering the fuel/air mixture, said premixer assembly including a valve for regulating the flow of compressed air; a compressed air supply plenum upstream of and in flow communication with said valve;

a shroud at least partly surrounding said liner and defining with said liner a cooling channel between said plenum and said principal dilution port; and a bypass channel between said plenum and said secondary dilution port, said bypass; channel in flow communication with said valve.

17. The combustor system as in claim 16, wherein said valve is a cylindrical valve for controlling the rate of compressed air flow to said premixer assembly and said secondary dilution ports.

* * * * *